(12) United States Patent
Bulger et al.

(10) Patent No.: US 11,979,767 B2
(45) Date of Patent: May 7, 2024

(54) AUTOMATIC ADJUSTMENT OF THROUGHPUT RATE TO OPTIMIZE WIRELESS DEVICE BATTERY PERFORMANCE

(71) Applicant: AT&T Intellectual Property I, L.P., Atlanta, GA (US)

(72) Inventors: John Bulger, Austin, TX (US); Yupeng Jia, Austin, TX (US); Prabhakara Aithal, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 561 days.

(21) Appl. No.: 17/106,033

(22) Filed: Nov. 27, 2020

(65) Prior Publication Data

US 2022/0174534 A1  Jun. 2, 2022

(51) Int. Cl.
*H04W 28/02* (2009.01)

(52) U.S. Cl.
CPC ............................ *H04W 28/0221* (2013.01)

(58) Field of Classification Search
None
See application file for complete search history.

(56) References Cited

U.S. PATENT DOCUMENTS

| | | | | |
|---|---|---|---|---|
| 9,392,273 B2* | 7/2016 | Gao | .................... | H04N 21/4143 |
| 10,025,718 B1* | 7/2018 | Wasiq | ................. | G06F 12/0866 |
| 10,432,483 B1* | 10/2019 | Thompson | ............ | H04L 43/045 |
| 10,476,804 B2* | 11/2019 | Miklós | ............. | H04W 28/0236 |
| 2004/0002339 A1* | 1/2004 | O'Connor | ............ | H04L 47/824 455/450 |
| 2006/0215582 A1* | 9/2006 | Castagnoli | .............. | H04L 45/20 370/254 |
| 2007/0121606 A1* | 5/2007 | Scheinert | ............ | H04M 1/2535 370/356 |
| 2007/0283385 A1* | 12/2007 | Qiu | ..................... | H04N 21/6125 348/E7.071 |
| 2008/0057894 A1* | 3/2008 | Aleksic | ............ | H04W 52/0258 455/187.1 |
| 2008/0247327 A1* | 10/2008 | Weil | ....................... | H04L 43/50 370/252 |
| 2011/0047287 A1* | 2/2011 | Harrang | .................. | H04L 47/11 713/340 |
| 2011/0182260 A1* | 7/2011 | Sivakumar | ............ | H04W 28/06 370/329 |
| 2011/0295983 A1* | 12/2011 | Medved | ................ | H04L 67/104 709/224 |
| 2013/0005390 A1* | 1/2013 | Oyama | ................ | H01Q 3/2605 455/524 |
| 2013/0142043 A1* | 6/2013 | Tapia | ................ | H04W 28/0268 370/229 |

(Continued)

*Primary Examiner* — Hassan A Phillips
*Assistant Examiner* — Gautam Sharma (57) ABSTRACT

An example method includes receiving a first signal indicating that a user of a first user endpoint device wishes to engage in a data transfer with a second device over a communication network, estimating at least one metric associated with the data transfer, sending the at least one metric associated with the data transfer to a remote server, and initiating the data transfer with the second device in accordance with a temporarily adjusted throughput that is adjusted by the remote server in response to the at least one metric associated with the data transfer.

20 Claims, 4 Drawing Sheets

(56) References Cited

U.S. PATENT DOCUMENTS

| | | | | |
|---|---|---|---|---|
| 2013/0275108 | A1* | 10/2013 | Sofka | G06Q 10/00 |
| | | | | 703/13 |
| 2014/0012706 | A1* | 1/2014 | Foerster | G06Q 30/04 |
| | | | | 705/26.81 |
| 2014/0282586 | A1* | 9/2014 | Shear | H04L 47/70 |
| | | | | 718/104 |
| 2015/0036051 | A1* | 2/2015 | Broberg | G06T 7/0002 |
| | | | | 348/571 |
| 2016/0072716 | A1* | 3/2016 | Chow | H04L 47/2475 |
| | | | | 709/219 |
| 2016/0315867 | A1* | 10/2016 | Hafez | H04L 69/22 |
| 2017/0134459 | A1* | 5/2017 | Shetty | H04L 65/80 |
| 2017/0251274 | A1* | 8/2017 | Fujii | H04N 21/44004 |
| 2019/0052560 | A1* | 2/2019 | Smith | H04L 45/30 |
| 2019/0174347 | A1* | 6/2019 | Dowlatkhah | H04W 8/18 |
| 2019/0191168 | A1* | 6/2019 | Kuusela | H04N 19/156 |
| 2019/0380128 | A1* | 12/2019 | Park | H04W 88/10 |
| 2020/0092882 | A1* | 3/2020 | Kato | H04W 72/542 |
| 2020/0344286 | A1* | 10/2020 | Lee | H04L 47/24 |
| 2022/0182813 | A1* | 6/2022 | Esserman | H04W 8/186 |
| 2022/0353163 | A1* | 11/2022 | Ramamurthi | H04L 43/10 |

* cited by examiner

AUTOMATIC ADJUSTMENT OF THROUGHPUT RATE TO OPTIMIZE WIRELESS DEVICE BATTERY PERFORMANCE

The present disclosure relates generally to wireless devices, and relates more particularly to devices, non-transitory computer-readable media, and methods for automatically adjusting the throughput rate of a wireless device to optimize device battery performance.

BACKGROUND

Wireless network performance is often measured in terms of bandwidth and throughput. Bandwidth is a fixed data speed (i.e., how fast packets or units of data travel between devices) provided by an Internet service provider, which may not be the same as the speed that is actually experienced by a device that is serviced by the Internet service provider. Thus, if bandwidth may be thought of as the theoretical amount of data that could be transferred between devices at a given time, then throughput may be thought of as the actual amount of data that is transferred between devices at a given time.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for automatically adjusting the throughput rate of a wireless device to optimize device battery performance. In one example, a method performed by a processing system includes receiving a first signal indicating that a user of a first user endpoint device wishes to engage in a data transfer with a second device over a communication network, estimating at least one metric associated with the data transfer, sending the at least one metric associated with the data transfer to a remote server, and initiating the data transfer with the second device in accordance with a temporarily adjusted throughput that is adjusted by the remote server in response to the at least one metric associated with the data transfer.

In another example, a non-transitory computer-readable medium may store instructions which, when executed by a processing system in a communications network, cause the processing system to perform operations. The operations may include receiving a first signal indicating that a user of a first user endpoint device wishes to engage in a data transfer with a second device over a communication network, estimating at least one metric associated with the data transfer, sending the at least one metric associated with the data transfer to a remote server, and initiating the data transfer with the second device in accordance with a temporarily adjusted throughput that is adjusted by the remote server in response to the at least one metric associated with the data transfer.

In another example, a device may include a processing system including at least one processor and non-transitory computer-readable medium storing instructions which, when executed by the processing system when deployed in a communications network, cause the processing system to perform operations. The operations may include receiving a first signal indicating that a user of a first user endpoint device wishes to engage in a data transfer with a second device over a communication network, estimating at least one metric associated with the data transfer, sending the at least one metric associated with the data transfer to a remote server, and initiating the data transfer with the second device in accordance with a temporarily adjusted throughput that is adjusted by the remote server in response to the at least one metric associated with the data transfer.

As discussed above, wireless network performance is often measured in terms of throughput, or the actual amount of data that is transferred between devices (broadly a first device and a second device) at a given time (e.g., in bits per second). Put another way, throughput measures how many packets arrive at their destinations successfully. There is an inherent tradeoff that has been observed between data throughput and device performance. For instance, many Internet service providers limit the data throughput rate allocated to mobile devices, which means that it may take longer for data traffic to travel to and from the mobile devices (e.g., longer than necessary, assuming the network can actually support higher throughput rates). During the data transfer, the charge (i.e., battery life) of a mobile device may deplete; the longer the transfer takes, the more of the charge that is typically depleted. If a device's charge is fully depleted, then the device may not be usable. This could create a safety hazard in certain situations (for instance, a mobile phone user may be unable to call for emergency services because he depleted the battery by streaming videos).

Examples of the present disclosure may provide an adaptable data throughput rate that is adjusted in response to data payload size, video resolution, codec, device screen size, data rate plan, frequencies supported by a device, device charge level, and/or other metrics. More particularly, the data throughput rate that is provided to a given mobile device may be dynamically adjusted to optimize the device's charge level (e.g., to not deplete the device's charge too quickly). One example of the present disclosure adjusts the throughput rate through the use of an optimizer which may be implemented as an application that runs on the mobile device. The optimizer may detect metrics related to a data transfer and or the characteristics of the mobile device, and may negotiate with a remote network device (e.g., a server) to adjust the throughput rate that is allocated to the mobile device, at least for the duration of the data transfer. These and other aspects of the present disclosure are discussed in greater detail below in connection with the examples of FIGS. 1-4.

Figure 1:
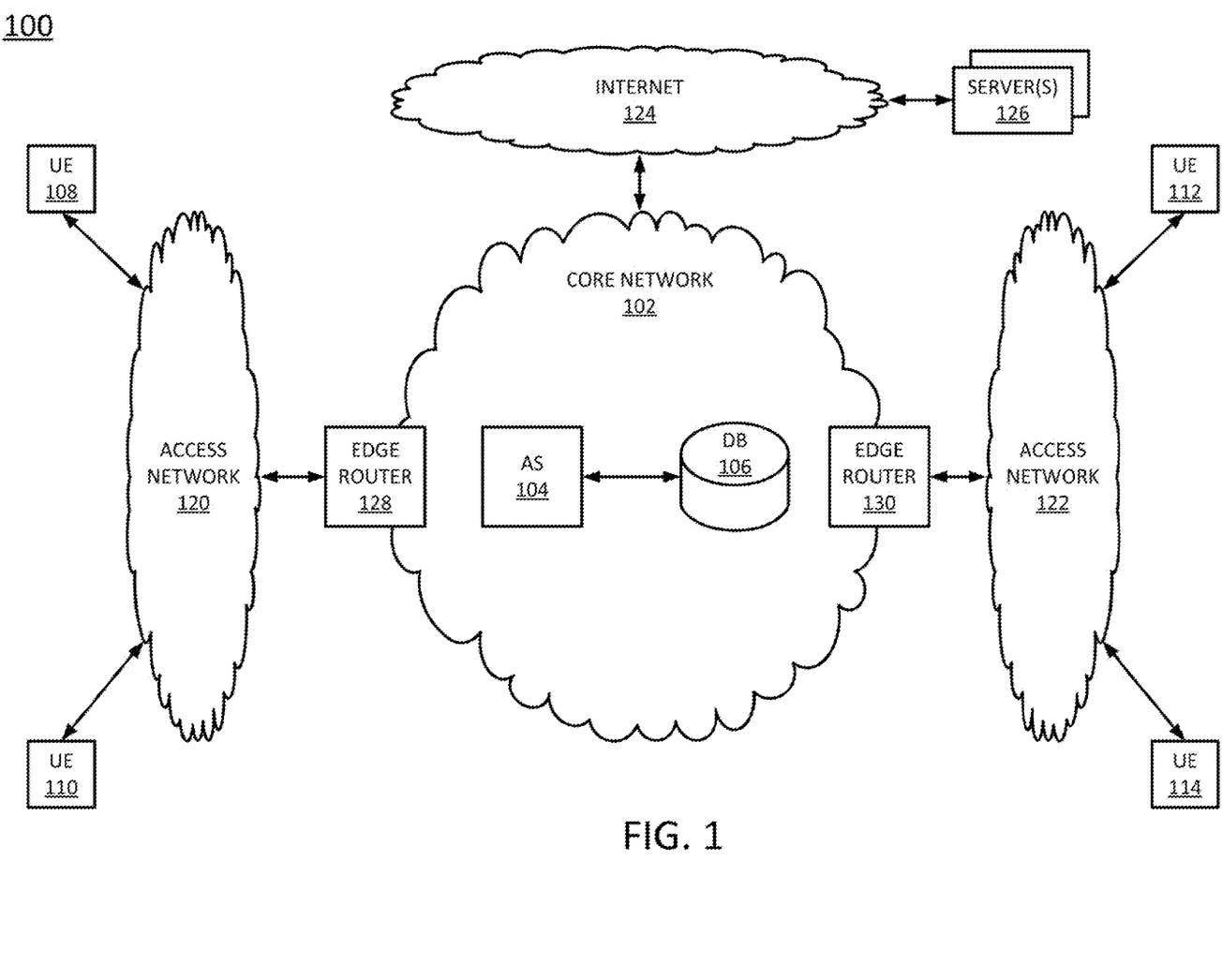
FIG. 1 illustrates an example system in which examples of the present disclosure for automatically adjusting the throughput rate of a wireless device to optimize device battery performance may operate.

To further aid in understanding the present disclosure, FIG. 1 illustrates an example system 100 in which examples of the present disclosure for automatically adjusting the throughput rate of a wireless device to optimize device battery performance. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3$^{rd}$ party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device. For example, the user endpoint devices 108, 110, 112, and 114 may each comprise a mobile device, a cellular smart phone, a gaming console, a set top box, a laptop computer, a tablet computer, a desktop computer, an Internet of Things (IoT) device, a wearable smart device (e.g., a smart watch, a fitness tracker, a head mounted display, or Internet-connected glasses), an application server, a bank or cluster of such devices, and the like.

In one example, the user endpoint devices 108, 110, 112, and 114 may each run an optimizer application that communicates with the AS 104 (e.g., a remote device or server) to adjust the throughput allocated to the user endpoint devices 108, 110, 112, and 114 for data transfer operations. For instance, optimizer application may evaluate one or more metrics of measurable characteristics of data to be transferred or of the user endpoint device itself when the user endpoint device is to engage in a data transfer operation (e.g., as either the source or destination of the data to be transferred). For instance, measurable characteristics of the data to be transferred may include the size of the data, the resolution of the data, and the codec used to compress or decompress the data. Measurable characteristics of the user endpoint device may include the size of the display of the user endpoint device, the current charge level of the user endpoint device, and the cellular or wireless frequency bands supported by the user endpoint device.

The optimizer application may, based on the evaluation of the metrics and/or on the current charge level of the user endpoint device, temporarily adjust a throughput of the user endpoint device (e.g., for all or part of the data transfer), in order to minimize further depletion of the charge as a result of the data transfer. For instance, the throughput could be temporarily increased relative to a default throughput in order to reduce the amount of time needed to complete the data transfer (as long transfer times may cause greater depletion of charge).

In some cases, the optimizer application may autonomously adjust the throughput (e.g., without exceeding a maximum throughput allowed by a network service provider or falling below a minimum throughput necessary to support a required quality of service). In other cases, however, the throughput may be adjusted by a remote device or server (e.g., an application server operated by a network service provider, such as AS 104) to which the optimizer application reports the metrics of measurable characteristics. In other cases, both the optimizer application and the remote device may make adjustments to the throughput. For instance, the optimizer application may not be authorized to increase the throughput by more than a first amount (or to more than a first rate). However, the remote device may be authorized to increase the throughput by even more, if the remote device determines that a further increase would be necessary.

To this end, the user endpoint devices 108, 110, 112, and 114 may comprise one or more physical devices, e.g., one or more computing systems or servers, such as computing system 400 depicted in FIG. 4, and may be configured as described below.

In one example, one or more servers 126 may be accessible to user endpoint devices 108, 110, 112, and 114 via Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for automatically adjusting the throughput rate of a wireless device to optimize device battery performance, as described herein. For instance, the AS 104 may be configured to operate as a Web portal or interface via which an optimizer application running on a user endpoint device, such as any of the UEs 108, 110, 112, and/or 114 (e.g., wireless devices), may access a service that automatically adjusts the throughput rate of a wireless device to optimize device battery performance.

To this end, the AS 104 may comprise one or more physical devices, e.g., one or more computing systems or servers, such as computing system 400 depicted in FIG. 4, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

For instance, in one example, the AS 104 (e.g., a remote device or server) may obtain, from an optimizer application running on one of the user endpoint devices 108, 110, 112, or 114, one or more metrics of measurable characteristics of data to be transferred or of the user endpoint device itself when the user endpoint device is to engage in a data transfer operation (e.g., as either the source or destination of the data to be transferred). For instance, as discussed above, measurable characteristics of the data to be transferred may include the size of the data, the resolution of the data, and the codec used to compress or decompress the data. Measurable characteristics of the user endpoint device (e.g., broadly a first user endpoint device) may include the size of the display of the user endpoint device, the current charge level of the user endpoint device, and the cellular or wireless frequency bands supported by the user endpoint device.

In one example, the AS 104 may, based on evaluation of the metrics and/or on the current charge level of the user endpoint device, temporarily adjust a throughput of the user endpoint device (e.g., for all or part of the data transfer), in order to minimize further depletion of the charge as a result of the data transfer. For instance, the throughput could be temporarily increased relative to a default throughput in order to reduce the amount of time needed to complete the data transfer (as long transfer times may cause greater depletion of charge). Any adjustment made by the AS 104 to the throughput could be in addition to an adjustment made by the optimizer application.

The AS 104 may have access to at least one database (DB) 106, where the DB 106 may store information related to the user endpoint devices 108, 110, 112, and 114. For instance, the information could include information about service plans associated with the user endpoint devices 108, 110, 112, and 114, where the service plans may specify, for each user endpoint device 108, 110, 112, and 114, a maximum permissible throughput, a maximum amount of data that is permitted to be uploaded/downloaded, and/or other information associated with service provided by a network service provider to the user endpoint devices 108, 110, 112, and 114.

In another example, the DB 106 may store a data structure, such as a table, that maps the values of certain metrics to corresponding adjustments in throughput. For instance, a device charge level that is below a first threshold may be mapped to a first increase in throughput, while a device charge level that is below a second threshold may be mapped to a second increase in throughput. Other metrics, such as any of the metrics described above, could also be mapped to corresponding throughput adjustments.

In one example, DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for automatically adjusting the throughput rate of a wireless device to optimize device battery performance, as described herein. Example methods for automatically adjusting the throughput rate of a wireless device to optimize device battery performance are described in greater detail below in connection with FIGS. 2 and 3.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
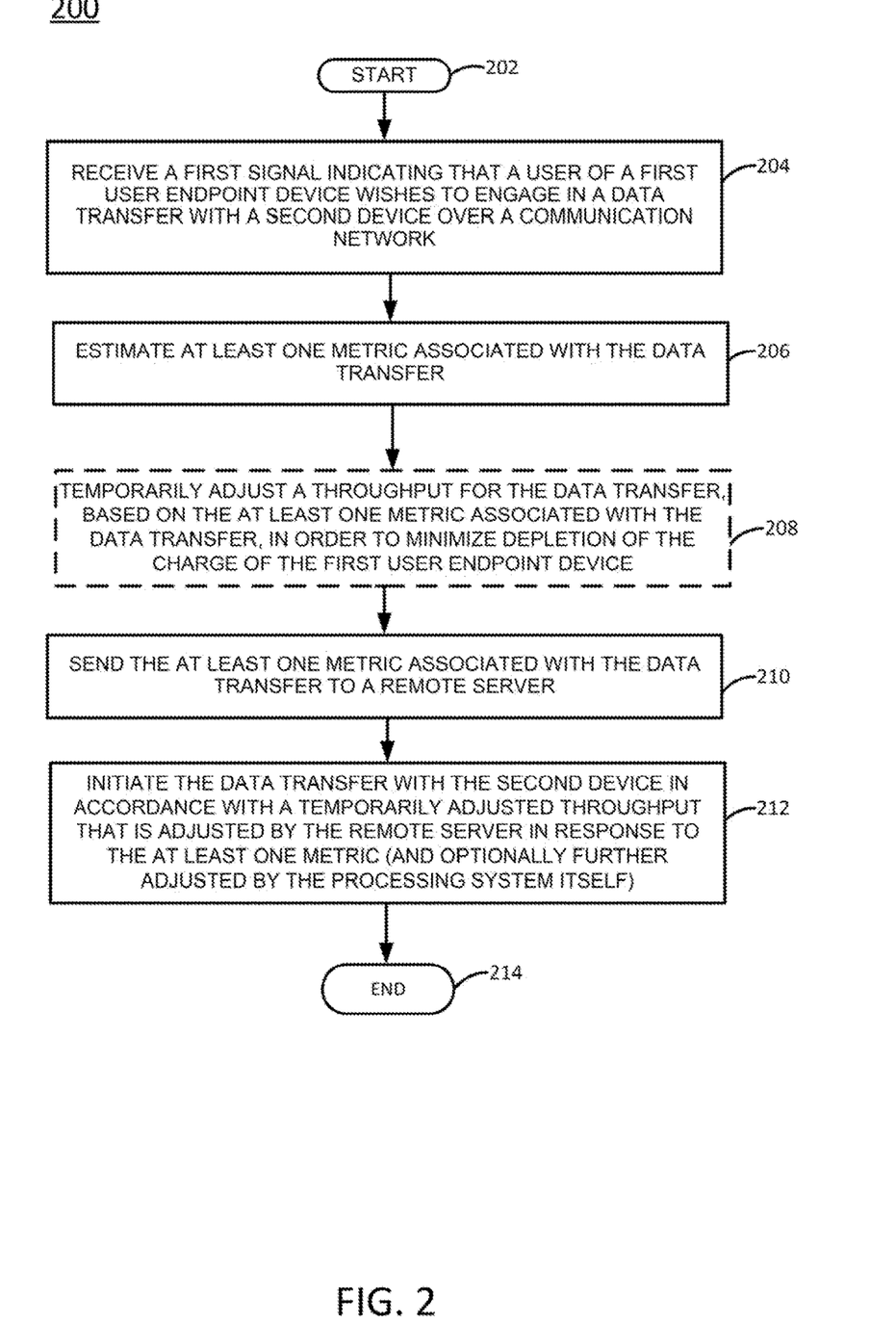
FIG. 2 illustrates a flowchart of an example method for automatically adjusting the throughput rate of a wireless device to optimize device battery performance, in accordance with the present disclosure.

FIG. 2 illustrates a flowchart of an example method 200 for automatically adjusting the throughput rate of a wireless device to optimize device battery performance, in accordance with the present disclosure. In one example, steps, functions and/or operations of the method 200 may be performed by a device as illustrated in FIG. 1, e.g., AS 104 or any one or more components thereof. In one example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may receive a first signal indicating that a user of a first user endpoint device wishes to engage in a data transfer with a second device over a communication network. For instance, the first user may wish to use the first user endpoint device to download data from the second device (which may be, e.g., a media server of a media service provider, another user endpoint device, or the like) in the communication network. As an example, the first user may wish to use the first user endpoint device to stream a video from a video streaming service. In this case, to stream the video, the first user endpoint device may download chunks of the video and store the chunks in a buffer in a memory of the first user endpoint device. As the chunks are played back on the first user endpoint device and evicted from the buffer, the first user endpoint device may download additional chunks of the video. This process may continue until all chunks of the video have been downloaded or until the first user endpoint device receives a signal to stop streaming the video. The chunks may be delivered to the first user endpoint device in a plurality data packets, where the plurality of data packets may collectively comprise a data stream that originates at a media server associated with the video streaming service and terminates at the first user endpoint device.

In another example, the first user may wish to use the first user endpoint device to upload data to the second device (which may be, e.g., a media server of a media service provider, another user endpoint device, or the like) in the communication network. As an example, the first user may wish to upload a video that the first user recorded on the first user endpoint device to a video sharing web site that is hosted by an application server (e.g., a media server) in the communication network 102 or to another application server (e.g., server 126) outside of the communication network 102. The video may be transferred to the application server in a plurality of data packets that collectively comprise a data stream, where the data stream originates at the first user endpoint device and terminates at the application server.

In step 206, the processing system may estimate at least one metric associated with the data transfer. In one example, the at least of metric comprises a measurable characteristic of the data to be transferred via the data transfer. For instance, in one example, the at least one metric may comprise a size of the data to be transferred (e.g., in bytes or kilobytes). The larger the size of the data to be transferred, the longer it may take the data transfer to complete (and, thus, the more of the charge of the first user endpoint device that may be depleted). Where the data to be transferred is to be downloaded from the second device, the processing system may determine the size of the data to be transferred by consulting a manifest file provided by the second device. Where the data to be transferred is to be uploaded to a remote destination, the processing system may determine the size of the data to be transferred by consulting local memory.

In another example, the at least one metric may comprise a resolution of the data to be transferred. For instance, where the data to be transferred comprises a video file, the video may be available at a plurality of resolutions; higher resolutions typically require greater bandwidth (and throughput) for transfer, as well as greater encoding processing resources at the destination of the transfer. The greater the amount of bandwidth consumed by the data transfer (and the greater the amount of encoding processing resources needed to process the data to be transferred), the more of the charge of the first user endpoint device that may be depleted. Where the data to be transferred is to be downloaded from the second device, the processing system may determine the resolution of the data to be transferred by consulting a manifest file provided by the second device. Where the data to be transferred is to be uploaded to the second device, the processing system may determine the resolution of the data to be transferred by consulting local memory of the first user endpoint device.

In another example, the at least one metric may comprise the codec to be used to compress and/or decompress the data to be transferred. For instance, different codecs compress data to different degrees, discard different amounts of data, and/or allow data transfers at different rates, and the like. Whether the source and the destination of a data transfer use the same codec or different codecs may also affect the throughput of a data transfer and the amount of processing that must be performed by the source and/or destination of the data transfer. The processing system may determine the codec used by the second device (e.g., source or destination) by consulting a manifest file provided by the remote device or by querying the remote device. The processing system may determine the codec used by the first user endpoint device (e.g., source or destination) by consulting its local memory.

In another example, the at least one metric may comprise a measureable characteristic of the first user endpoint device. For instance, in one example, a measurable characteristic of the first user endpoint device may comprise the size of the first user endpoint device's display. In general, video of the same resolution will look sharper on a smaller screen than on a larger screen. Thus, for instance, if the first user endpoint device is a mobile phone that is streaming video, a lower resolution video stream (e.g., lower bit rate chunks of video) may be downloaded to the first user endpoint device to minimize the length of time necessary to stream the entire video. In one example, the processing system may determine the display size of the first user endpoint device by consulting the settings of the first user endpoint device.

In another example, a measurable characteristic of the first user endpoint device may comprise the wireless or cellular frequency bands supported by the first user endpoint device. For instance, certain frequency bands (e.g., the 2.4 Ghz band) are more susceptible to radio interference, and, therefore unexpected connection losses. When a connection is unexpectedly loss, a data upload or download may take more time to complete. For instance the data upload or download may have to be restarted, or time and processing resources (and therefore device charge) may be spent trying to restore the connection to resume the data upload or download. Other frequency bands (e.g., the 5.0 GHz range) are less susceptible to radio interference. In addition, higher frequencies may support faster data transfer rates, which, as discussed above, may minimize the amount of time necessary to complete a data transfer. In one example, the processing system may determine the frequency bands supported by the first user endpoint device by consulting the settings of the first user endpoint device.

In another example, a measurable characteristic of the first user endpoint device may comprise the data rate plan associated with the first user endpoint device. For instance, the data rate plan may specify a maximum amount of data that the first user endpoint device is permitted to transfer (upload and/or download) over a fixed period of time. For instance, if the first user endpoint device is a mobile phone, an agreement with a mobile communications service provider that provides service to the mobile phone may limit the mobile phone to using x gigabytes per month. Higher connection speeds between the first user endpoint device and a remote source or destination may consume the allocated gigabytes more quickly, while slower connection speeds consume the allocated gigabytes more slowly. However, as also noted above, slower connection speeds may result in more device charge being consumed to transfer the same amount of data.

In another example, the measurable characteristic of the first user endpoint device may comprise the current charge level of the user endpoint device. In one example, the current charge level may be measured as a percentage of the maximum charge level for the first user endpoint device (e.g., x percent charged, or x percent battery life remaining). As discussed above, device charge can be depleted at different rates based upon different parameters of a data transfer.

In optional step 208 (illustrated in phantom), the processing system may temporarily adjust a throughput for the data transfer, based on the at least one metric associated with the data transfer, in order to minimize depletion of the charge of the first user endpoint device. In one example, the processing system may adjust the throughput based on at least one selected from the group of: the size of the data to be transferred, the resolution of the data to be transferred, the codec to be used to compress and/or decompress the data to be transferred, and the current charge level of the first user endpoint device. For instance, if the size of the data to be transferred is greater than a threshold size, then the processing system may increase the throughput in order to facilitate quicker completion of the data transfer.

Similarly, if the resolution of the data to be transferred is greater than a threshold resolution, then the processing system may increase the throughput in order to facilitate quicker completion of the data transfer.

If the codec used by the first user endpoint device to encode or decode data associated with the data transfer would result in the duration of the data transfer exceeding a threshold duration, then the processing system may increase the throughput in order to facilitate quicker completion of the data transfer.

In another example, if the charge level of the first user endpoint device is below a threshold (e.g., a percentage of the maximum possible charge, such as fifty percent charge), then the processing system may increase the throughput in order to complete the data transfer more quickly, and, ideally, deplete less of the charge.

In one example, the throughput is adjusted (i.e., raised or lowered from a default throughput) for at least part of the duration of the data transfer. In one particular example, the throughput may be adjusted for the entire duration of the data transfer, and then returned to a default throughput once the data transfer is complete. Thus, the adjustment to the throughput may be temporary. It should be noted that the adjustment to the throughput can be implement by the first endpoint device, the remote server, or both the first endpoint device and the remote server working together.

In step 210, the processing system may send the at least one metric associated with the data transfer to a remote server. In one example, the remote server may be a server operated by the operator of the communication network, where the remote server may control service parameters associated with the first user endpoint device's use of the communication network. For instance, the remote server could be the AS 104 illustrated in FIG. 1.

In step 212, the processing system may initiate the data transfer with the second device in accordance with a temporarily adjusted throughput that is adjusted by the remote server in response to the at least one metric (and optionally further adjusted by the processing system itself as discussed in connection with step 208). In one example, the remote server may adjust the throughput based on consideration of any of the metrics discussed above in connection with step 206. For instance, any single metric or combination of metrics of the metrics discussed above could be evaluated to determine an adjusted throughput that minimizes the charge depletion of the first user endpoint device. In one example, reinforced learning techniques may be trained on historical data to adaptively adjust the combinations of metrics to optimize throughput. In a further example, the remote server may further adjust the throughput based on at least one selected from a group of: the display size of the first user endpoint device and the data rate plan associated with the first user endpoint device.

For instance, where the display size of the first user device is below a threshold and may be able to display a lower resolution video, the remote server may increase the throughput in order to complete the data transfer more quickly. Similarly, where the data rate plan associated with the first user endpoint device may result in the data transfer taking longer than a threshold amount of time (e.g., more than x seconds or minutes), the remote server may increase the throughput in order to complete the data transfer more quickly.

The method 200 may end in step 214. The throughput associated with the first user device may be adjusted back to the default throughput once the data transfer is completed. Thus, the adjustment to the throughput may be temporary. Adjustments to throughput may be made on a case-by-case basis whenever the first user endpoint device seeks to engage in a data transfer with a second device. For instance, when the first user endpoint device seeks to stream a video while the charge level is close to full (e.g., 100 percent), no adjustment to the default throughput may be made. However, if the charge level is below a threshold, and/or other parameters of the video streaming activity would result in further depletion of the charge (e.g., the size of the video is very large or the resolution is very high), then the default throughput rate may be increased in order to minimize charge depletion.

Although the method 200 describes an example in which the throughput associated with a first user endpoint device is adjusted by a remote server (e.g., associated with an operator of the communication network) and optionally further adjusted by the processing system of the first user endpoint device itself, other implementations are possible. For instance, the processing system of the first user endpoint device may adjust the throughput without any input from the remote server (e.g., as long as the adjusted throughput does not exceed any maximum throughput that may be allocated to the first user endpoint device, or drop below a minimum throughput that would cause some guaranteed quality of service to not be met). In a further example, the throughput could optionally be further adjusted by the remote server.

Furthermore, although examples discussed above describe increasing throughput, it will be appreciated that there may be instances in which the throughput could be decreased instead in order to minimize charge depletion.

Thus, examples of the present disclosure recognize that certain parameters of a data transfer, in combination with the throughput of the connection used for the data transfer, may cause the charge of a device that is involved in the data transfer (e.g., as either the source or the destination of the data) to be depleted more or less quickly. By detecting when the charge of the device may already have reached a certain level of depletion (e.g., a charge level lower than a threshold), and by adjusting the throughput of the connection for a data transfer accordingly, further depletion of the charge can be minimized. Thus, the device may still retain some level of charge that may be needed after the data transfer (e.g., in case of emergency or other circumstances that may require the ability to communicate).

Figure 3:
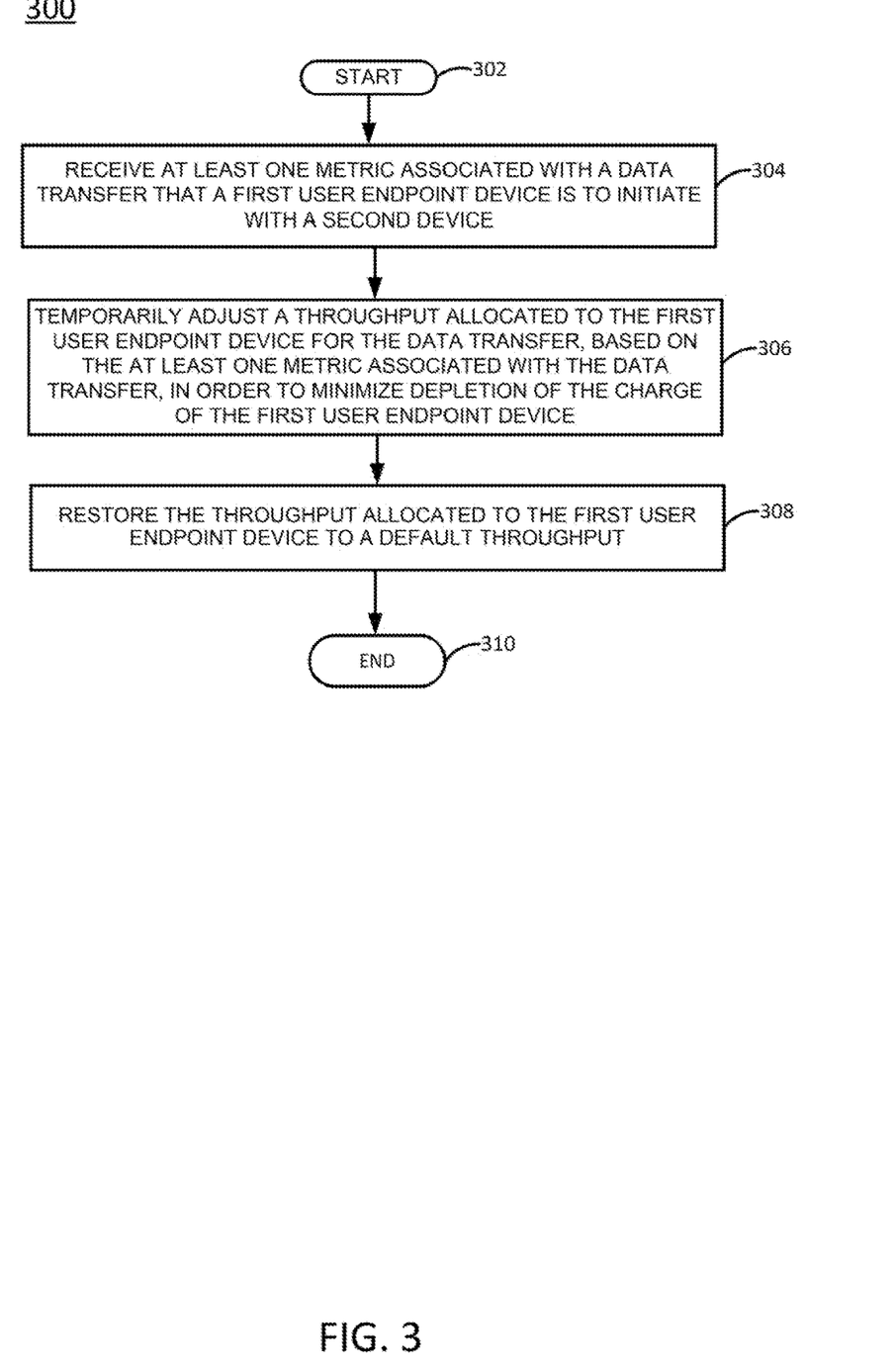
FIG. 3 illustrates a flowchart of an example method for automatically adjusting the throughput rate of a wireless device to optimize device battery performance, in accordance with the present disclosure.

FIG. 3 illustrates a flowchart of an example method 300 for automatically adjusting the throughput rate of a wireless device to optimize device battery performance, in accordance with the present disclosure. In one example, steps, functions and/or operations of the method 300 may be performed by a device as illustrated in FIG. 1, e.g., AS 104 or any one or more components thereof. In one example, the steps, functions, or operations of method 300 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 300 is described in greater detail below in connection with an example performed by a processing system, such as processing system 402.

The method 300 begins in step 302 and proceeds to step 304. In step 304, the processing system may receive at least one metric associated with a data transfer that a first user endpoint device is to initiate with a second device. As discussed above, in one example, the first user endpoint device may be attempting to download data from the second device. However, in another example, the first user endpoint device may be attempting to upload data to the second device. As an example, the first user endpoint device may be attempting to stream a video from a video streaming service.

The at least one metric may be at least one selected from a group of: a measurable characteristic of the data to be transferred via the data transfer and a measurable characteristic of the first user endpoint device. For instance, measurable characteristics of the data to be transferred may include the size of the data, the resolution of the data, and the codec used to compress or decompress the data. Measurable characteristics of the first user endpoint device may include the size of the display of the first user endpoint device, the current charge level of the first user endpoint device, and the cellular or wireless frequency bands supported by the first user endpoint device.

In step 306, the processing system may temporarily adjust a throughput allocated to the first user endpoint device for the data transfer, based on the at least one metric associated with the data transfer, in order to minimize depletion of the charge of the first user endpoint device. As discussed above, a default throughput allocated to the first user endpoint device may be temporarily increased or decreased for all or part of the data transfer. In one example, the processing system may determine that the throughput should be adjusted when the current charge level of the first user endpoint device is below a threshold charge level. Thus, the adjustment of the throughput may be made to minimize further depletion of the charge level resulting from the data transfer.

In step 308, the processing system may restore the throughput allocated to the first user endpoint device to a default throughput. For instance, the default throughput may be restored once the data transfer is completed, or once a predefined amount or percentage of the data transfer is completed.

The method 300 may end in step 310.

It should be noted that the methods 200 and 300 may be expanded to include additional steps or may be modified to include additional operations with respect to the steps outlined above. In addition, although not specifically specified, one or more steps, functions, or operations of the methods 200 and 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

Figure 4:
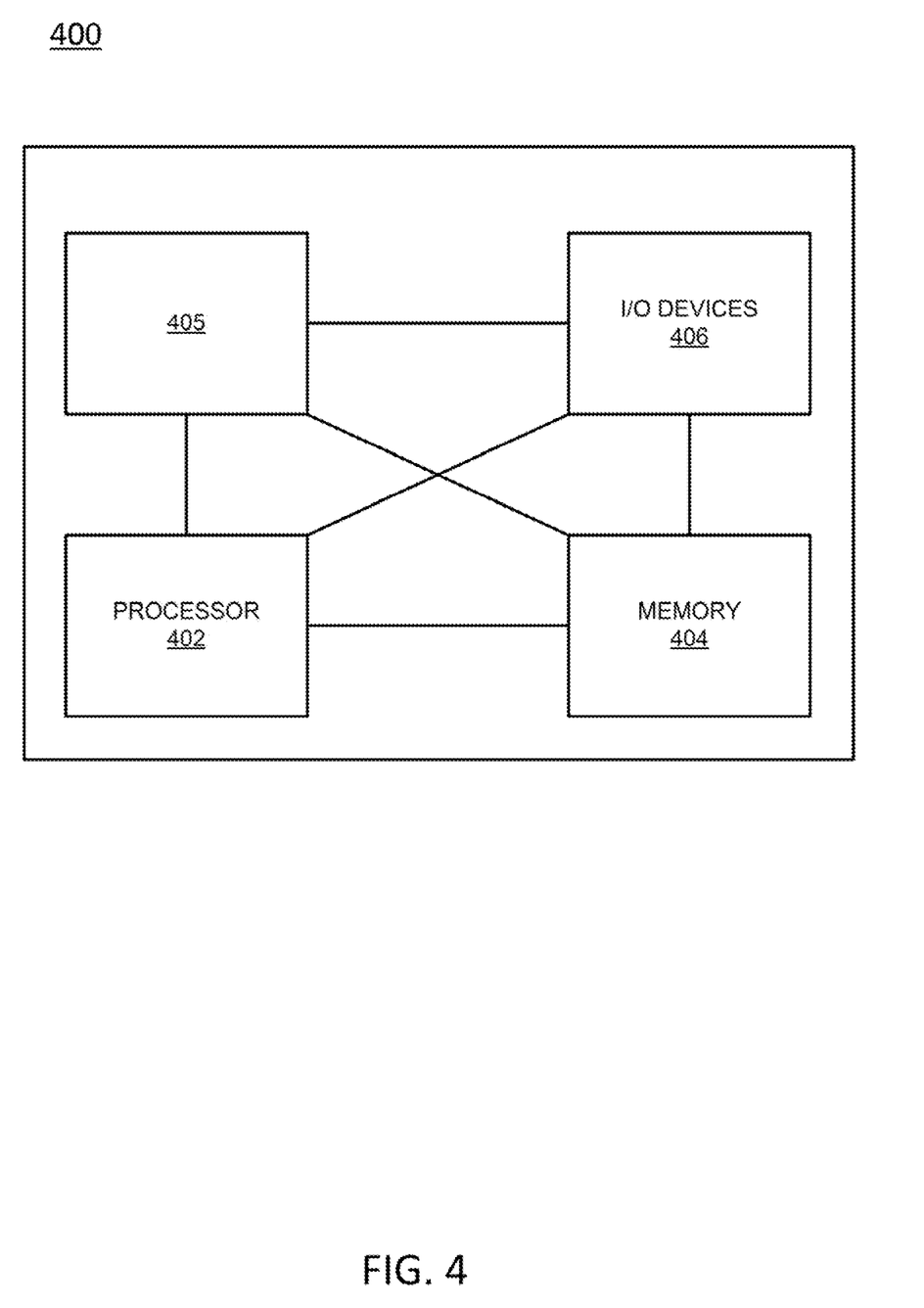
FIG. 4 depicts a high-level block diagram of a computing device or processing system specifically programmed to perform the functions described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for adjusting the throughput rate of a wireless device to optimize device battery performance, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300 or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or 300. In one example, instructions and data for the present module or process 405 for adjusting the throughput rate of a wireless device to optimize device battery performance (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for adjusting the throughput rate of a wireless device to optimize device battery performance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   receiving, by a processing system including at least one processor, a first signal indicating that a user of a first user endpoint device wishes to engage in a data transfer with a second device over a communication network;
   estimating, by the processing system, at least one metric associated with the data transfer;
   sending, by the processing system, the at least one metric associated with the data transfer to a remote server; and
   initiating, by the processing system, the data transfer with the second device in accordance with a throughput determined by the remote server in response to the at least one metric associated with the data transfer and in response to a current level of a charge of the first user endpoint device being below a threshold, wherein the throughput determined by the remote server comprises an adjustment to increase the throughput relative to a default throughput allocated to the first user endpoint device in order to cause the data transfer to complete more quickly, and wherein the throughput determined by the remote server is designed to deplete the charge of the first user endpoint device more slowly than the default throughput.

2. The method of claim 1, wherein the at least one metric comprises a measurable characteristic of data to be transferred via the data transfer.

3. The method of claim 2, wherein the measurable characteristic of the data comprises a size of the data.

4. The method of claim 2, wherein the measurable characteristic of the data comprises a resolution of the data.

5. The method of claim 2, wherein the measurable characteristic of the data comprises a codec to be used to compress or decompress the data.

6. The method of claim 1, wherein the at least one metric comprises a measurable characteristic of the first user endpoint device.

7. The method of claim 6, wherein the measurable characteristic of the first user endpoint device comprises a size of a display of the first user endpoint device.

8. The method of claim 6, wherein the measurable characteristic of the first user endpoint device comprises a wireless frequency band supported by the first user endpoint device.

9. The method of claim 6, wherein the measurable characteristic of the first user endpoint device comprises a data rate plan associated with the first user endpoint device.

10. The method of claim 1, further comprising, prior to the initiating:
    temporarily adjusting, by the processing system, the default throughput for the data transfer, based on the at least one metric associated with the data transfer, in order to minimize depletion of the charge of the first user endpoint device, wherein the throughput determined by the remote server comprises a further adjustment to the default throughput.

11. The method of claim 1, wherein the throughput determined by the remote server is decreased relative to the default throughput.

12. The method of claim 1, wherein the first user endpoint device is a mobile device.

13. The method of claim 12, wherein the data transfer comprises a download by the first user endpoint device of a plurality of data packets.

14. The method of claim 13, wherein the plurality of data packets comprises a video stream.

15. The method of claim 1, wherein the throughput determined by the remote server and the default throughput are different measures of an actual amount of data transferred between the first user endpoint device and the second device.

16. A non-transitory computer-readable medium storing instructions which, when executed by a processing system including at least one processor, cause the processing system to perform operations, the operations comprising:
    receiving a first signal indicating that a user of a first user endpoint device wishes to engage in a data transfer with a second device over a communication network;
    estimating at least one metric associated with the data transfer;

sending the at least one metric associated with the data transfer to a remote server; and initiating the data transfer with the second device in accordance with a throughput determined by the remote server in response to the at least one metric associated with the data transfer and in response to a current level of a charge of the first user endpoint device being below a threshold, wherein the throughput determined by the remote server comprises an adjustment to increase the throughput relative to a default throughput allocated to the first user endpoint device in order to cause the data transfer to complete more quickly, and wherein the throughput determined by the remote server is designed to deplete the charge of the first user endpoint device more slowly than the default throughput.

17. The non-transitory computer-readable medium of claim 16, wherein the at least one metric comprises a measurable characteristic of data to be transferred via the data transfer.

18. The non-transitory computer-readable medium of claim 17, wherein the measurable characteristic of the data comprises a size of the data.

19. The non-transitory computer-readable medium of claim 17, wherein the measurable characteristic of the data comprises a resolution of the data.

20. A device comprising:
a processing system including at least one processor; and
a non-transitory computer-readable medium storing instructions which, when executed by the processing system, cause the processing system to perform operations, the operations comprising:
receiving a first signal indicating that a user of a first user endpoint device wishes to engage in a data transfer with a second device over a communication network;
estimating at least one metric associated with the data transfer;
sending the at least one metric associated with the data transfer to a remote server; and
initiating the data transfer with the second device in accordance with a throughput determined by the remote server in response to the at least one metric associated with the data transfer and in response to a current level of a charge of the first user endpoint device being below a threshold, wherein the throughput determined by the remote server comprises an adjustment to increase the throughput relative to a default throughput allocated to the first user endpoint device in order to cause the data transfer to complete more quickly, and wherein the throughput determined by the remote server is designed to deplete the charge of the first user endpoint device more slowly than the default throughput.

* * * * *